L. WOLF.
AUTOMOBILE VEHICLE.
APPLICATION FILED APR. 1, 1912.
1,038,054.
Patented Sept. 10, 1912.
2 SHEETS—SHEET 1.
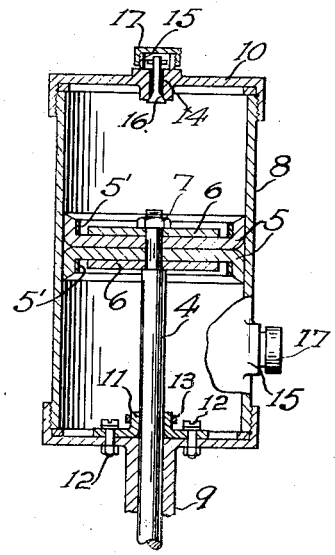
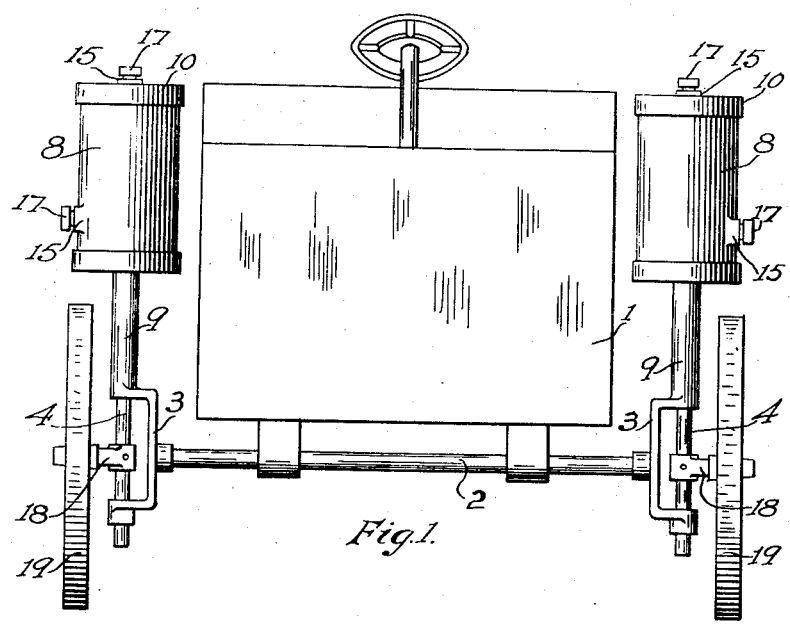
Witnesses
N. Brandt.
A. A. Olson
Inventor
Lewis Wolf
By Joshua R. H. Potts
his Attorney L. WOLF.
AUTOMOBILE VEHICLE.
APPLICATION FILED APR. 1, 1912.
1,038,054.
Patented Sept. 10, 1912.
2 SHEETS—SHEET 2.
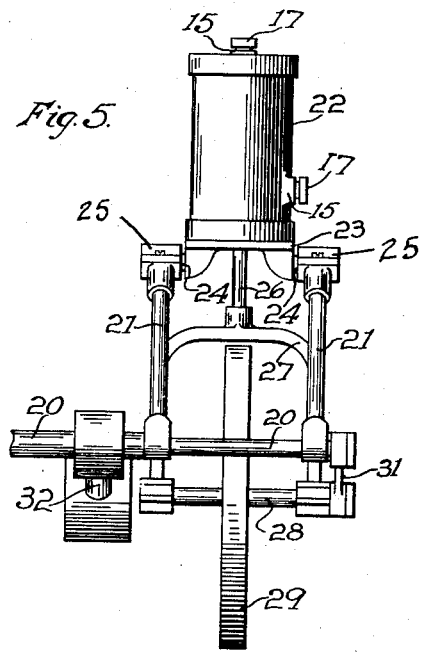
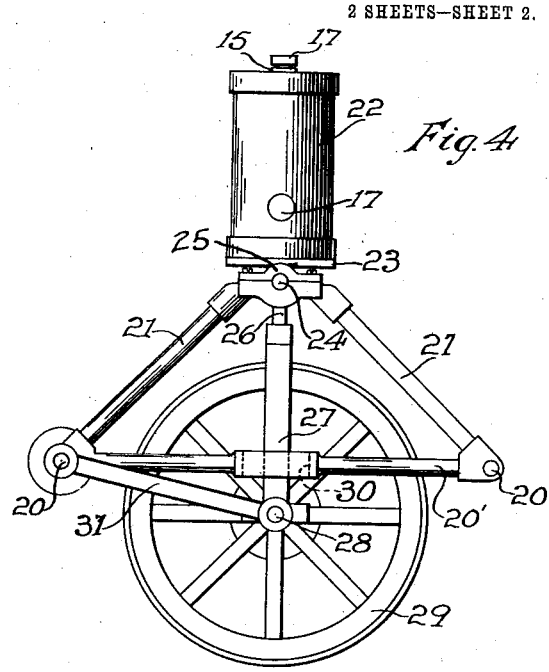
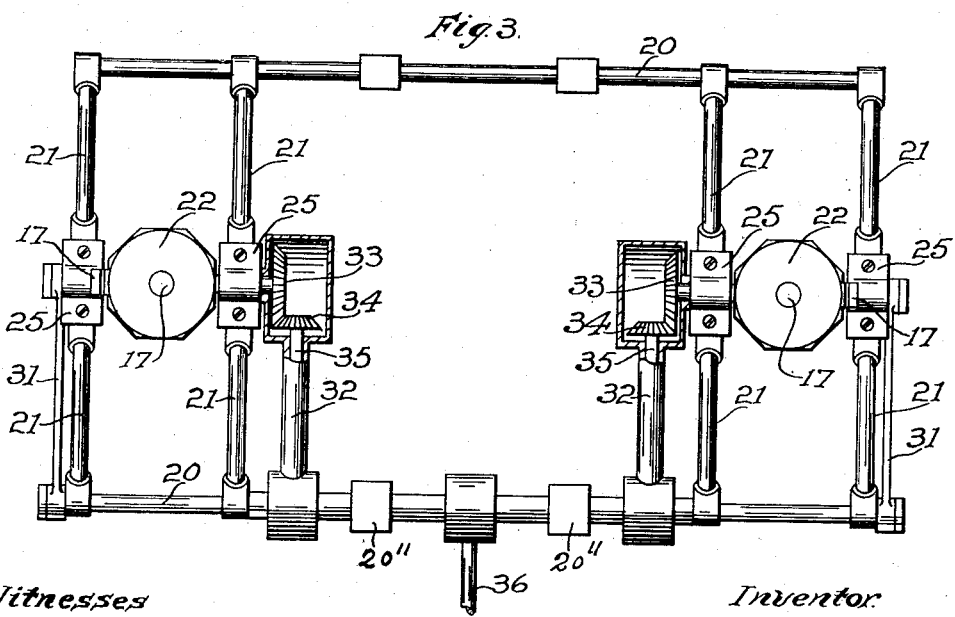
Witnesses
N. Brandt
A. A. Olson
Inventor
Lewis Wolf.
By Joshua R. H. Potts
his Attorney

UNITED STATES PATENT OFFICE.

LEWIS WOLF, OF McNABB, ILLINOIS.

AUTOMOBILE VEHICLE.

1,038,054.  Specification of Letters Patent.  Patented Sept. 10, 1912.

Application filed April 1, 1912. Serial No. 687,787.

*To all whom it may concern:*

Be it known that I, LEWIS WOLF, a citizen of the United States, and a resident of the city of McNabb, county of Putnam, and State of Illinois, have invented certain new and useful Improvements in Automobile Vehicles, of which the following is a specification.

My invention relates to improvements in automobile vehicles, and has for its object to provide a substitute for pneumatic tires in vehicles of this character.

A further object is the production of a construction adapted as a substitution for pneumatic tires, which will be of durable and economical construction and efficient in operation.

Other objects will appear hereinafter.

The invention consists further in certain details of construction and arrangements of parts which will be hereinafter more fully described and particularly pointed out in the appended claims.

My invention will be best understood by reference to the accompanying drawings forming a part of this specification, and in which—

Figure 1 is a front view of an automobile vehicle embodying my invention, Fig. 2 is an enlarged central longitudinal section of one of the pneumatic cylinders included in the construction, Fig. 3 is a sectional top plan view of the supporting frame at the rear end of the vehicle body, Fig. 4 is a side elevation of the construction shown in Fig. 3, and Fig. 5 is a front elevation of one side of the construction shown in Fig. 3.

The preferred form of construction, as illustrated in the drawings, comprises a body 1 which may be of any preferred or conventional design. The front end of the body 1 is mounted upon the front axle 2 to which the same is rigidly secured. said axle being non-rotatable. Provided at the respective extremities of the axle 2 are bearings 3 in which are slidably mounted vertically extending piston stems 4. Carried at the upper ends of the stems 4 are pistons, each of which, as shown in Fig. 2, comprises cup members 5, formed preferably of leather, which are held in postion between circular plates 6, the latter being clamped to the corresponding stem by means of a nut 7. Arranged within each of the cups 5 is a split circular leaf spring 5', the springs 5' being adapted to force the peripheries of said cups into close engagement with the cylinder walls in which the same are mounted, to insure a tight fit and prevent leakage. Said pistons are slidably mounted in cylinders 8 which are mounted upon the upper ends of extensions 9 of the bearings 3, the upper ends of said cylinders being closed by heads 10. Each of the piston stems 4 at the point where the same enters the corresponding bearing extension 9, is surrounded by a packing 11, preferably of leather, which is secured in position by bolts 12. Coöperating with the packing 11 is a split spring ring 13 which encircles the upper end portion thereof, serving to press the latter into snug engagement with the piston stem to effect a tight connection.

In practice, fluid, and preferably air, under pressure will be supplied to each end of each of the cylinders 8 through ports 14 which are provided in the cylinder head 10 and in the lateral wall of the cylinder adjacent the lower end thereof, as shown in Fig. 2. The fluid supplied to the upper ends of said cylinders will coöperate with the pistons operating therein and serve to support the weight of the vehicle body, the latter being thus pneumatically supported, the results, as far as absorbing shocks are concerned, being the same as when pneumatic tires are employed. The pressure in the upper ends of the cylinders 8 will be greater than in the lower ends, since the fluid in the lower ends serves merely as a means of preventing excessive upward movement or jarring of the vehicle body. Screw-threaded nipples 15 are provided at the ports 14 for connection with a compressed fluid supply pipe. Check valves 16 of suitable construction are provided to automatically govern the ports 14 permitting of ingress of compressed fluid to the cylinders, but preventing egress therefrom. The exhaust of air from the cylinders, when desired, may, however, be effected by depressing the stems of said valves, as will be readily understood. Screw caps 17 are provided which close the outer ends of said ports, said caps being threaded upon said nipples.

Secured to and projecting from the piston stems 4 are axle arms 18 upon which are rotatably mounted wheels 19, steering of said wheels being effected in the usual manner through the employment of steering arms and rods which are adapted to be connected with the axle arms 18.

The rearward end of the vehicle body is mounted upon a frame consisting, as shown in Fig. 3, of parallel transverse bars 20 and parallel longitudinal bars 20', the latter extending between and connecting corresponding ends of the bars 20, the vehicle body being mounted upon blocks 20'' provided upon bars 20. Arising from the frame bars 20 at the extremities of the bars 20', are inclined bars 21. Arranged at the upper ends of the bars 21 are cylinders 22 which are similar in construction to the cylinders 8 above described. The cylinders 22 are mounted upon plates 23 which are provided with trunnions 24 which rockingly engage bearings 25 provided at the upper ends of the bars 21, as clearly shown in Figs. 3, 4 and 5. The construction is such, as will be observed, that the cylinders 22 are mounted for free oscillatory movement. The stems 26 of the pistons operating in the cylinders 22 are formed at their lower ends with forks 27. Mounted in the bearing boxes provided at the lower ends of the arms of each of the forks 27, is an axle or shaft 28 carrying a wheel 29 which is arranged in the crutch of the fork, as shown. The lower ends of the arms of each of the forks 27 pass through elongated guide slots 30 provided in the frame bars 20', such construction permitting of slight oscillation of the forks 27 which is necessarily incident to vertical movement thereof. Pivotally connected with the respective ends of each of the axles 28 are arms 31 and 32, the forward ends of said arms being swingingly connected with the forward bar 20. The arms 31 and 32 serve as means of maintaining the forks 27 in substantially vertical position, permitting, however, of free vertical movement of said forks so that the weight of the rear end of the vehicle body will be supported by the compressed fluid in the upper ends of cylinders 22, as will be readily understood. The arms 32, however, are of hollow construction, as shown in Fig. 3, in order to adapt the same for service as gear housings, the driving gears for the axles 28 being mounted therein. This driving gearing comprises beveled gears 33 provided at the inner extremities of the axles 28 which mesh with beveled gears 34 provided at the rearward ends of shafts 35 mounted in said arms 32, the forward ends of said shafts being operatively connected with the power shaft 36 of the vehicle. With this construction it will be seen that each of the rear driving wheels of the vehicle will be independent of the other, and so that, in use, when one wheel strikes an irregularity in the road which causes an upward movement thereof, the other wheel will not be affected by reason of such movement.

With the construction set forth it will be seen that the vehicle body will be supported upon four pneumatic cushions constituted in the upper ends of the cylinders 8 and 22 which will perform the function of the ordinary pneumatic tire, namely, to absorb shocks incident to irregularities in the roadbed.

While I have illustrated and described the preferred form of construction for carrying my invention into effect, this is capable of variation and modification without departing from the spirit of the invention. I, therefore, do not wish to be limited to the exact details of construction set forth, but desire to avail myself of such variations and modifications as come within the scope of the appended claims.

Having described my invention, what I claim as new and desire to secure by Letters Patent, is:

1. The combination with a vehicle body of a frame structure below said body; cylinders mounted in said frame; fork members slidably mounted in said frame; bearing boxes carried by said forks; wheels mounted between said bearing boxes and in the crutches of said forks; piston stems extending upwardly from said forks; and pistons secured to the ends of said stems, said pistons being slidably arranged in said cylinders, substantially as described.

2. The combination with a vehicle body of a frame structure below said body upon which the latter is supported; cylinders swingingly mounted in said frame; fork members slidably and swingingly mounted in said frame; bearing boxes carried by said forks; wheels mounted between said bearing boxes and the crutches of said forks; piston stems extending upwardly from said forks; and pistons secured to the upper ends of said stems, said pistons being slidably mounted in said cylinders, substantially as described.

3. The combination with a vehicle body of a frame structure below said body upon which the latter is supported; pneumatic cylinders swingingly mounted in said frame; fork members slidably and swingingly mounted in said frame; brace rods pivotally connected with said forks and swingingly connected with said frame; bearing boxes carried by said forks; wheels mounted between said bearing boxes and in the crutches of said forks; piston stems extending upwardly from said forks; and pistons secured to the upper ends of said stems, said pistons being slidably mounted in said cylinders, substantially as described.

4. The combination with a vehicle body of a frame structure arranged below said body upon which the latter is supported; vertically disposed pneumatic cylinders swingingly mounted in said frame; fork members slidably and swingingly mounted in said frame; brace rods pivotally connected with said forks and swingingly connected with said frame; bearing boxes carried by said forks; a short axle mounted in the bearing boxes of each of said forks; wheels mounted upon said axles in the crutches of said forks; piston stems extending upwardly from said forks; and pistons secured to the upper ends of said stems, said pistons being slidably mounted in said cylinders, substantially as described.

In testimony whereof I have signed my name to this specification in the presence of two subscribing witnesses.

LEWIS WOLF.

Witnesses:
J. E. BOMAN,
JOHN M. McNABB.